Patented Jan. 13, 1942

2,270,109

UNITED STATES PATENT OFFICE 2,270,109

MANUFACTURE OF METHYL AND ETHYL LEAD COMPOUNDS

George Calingaert and Harold A. Beatty, Detroit, Mich., assignors to Ethyl Gasoline Corporation, Detroit, Mich., a corporation of Michigan No Drawing. Application February 16, 1938
Serial No. 190,877

19 Claims. (Cl. 260—437)

Our invention relates to the manufacture of mixtures of lead compounds having only methyl and/or ethyl radicals, and including particularly the methylethyl lead compounds, trimethylethyl lead, dimethyldiethyl lead, and methyltriethyl lead. From the above mixtures one or compounds or other mixtures may be separated. Such mixtures or compounds may be used as anti-knocks with motor fuels. The object of our invention is to provide processes for the manufacture of these mixtures or compounds.

It is well known that, where ethyl chloride and sodium-lead alloy are used to make tetraethyl lead, if the composition of the alloy is controlled to correspond substantially to NaPb the reaction goes readily to completion without a catalyst and yields of 85 per cent and higher are obtained consistently. The remaining 15 per cent is used up in side reactions, primarily of the type of Wurtz reaction, yielding hydrocarbons. In the commercial process as now practiced, this reaction starts at about 35° C. and is completed within 6 hours at about 70° C. In this old practice, if the composition of the alloy departs from the composition NaPb, the yields are lower, and the use of catalysts including aluminum chloride has been suggested to improve the yield under these conditions. In the manufacture of tetraethyl lead as practiced at present on a commercial scale, it is an easy matter to control the composition of the sodium-lead alloy, with the result that no catalyst is used.

We have discovered that if methyl chloride, instead of ethyl chloride, is brought together with NaPb in the above process to make tetramethyl lead the yields are nil or merely a trace at temperatures of 35° C., 70° C. and even 100° C. The reaction becomes appreciable only at temperatures substantially higher than 100° C., but at these temperatures the reaction is so slow and the side reactions occur to such a degree that the yields are too low for the process to have commercial value. For example, yields of only 25 per cent have been obtained in 50 hours at 150° C.

We have discovered that the reaction of a mixture of methyl chloride and ethyl chloride with NaPb does not proceed according to the above described ethyl chloride process. The presence of as little as 10 per cent methyl chloride practically stops the reaction of ethyl chloride even at temperatures as high as 110° C.

According to the present invention we provide a process which causes the reaction between methyl chloride, ethyl chloride, and NaPb to proceed smoothly and to give good yields. In our process the use of a catalyst is essential. Even with a catalyst this reaction does not proceed according to the above described ethyl chloride process: conditions which produce high yields in the above described ethyl chloride process produce far smaller or negligible yields in our process. Where yields are obtained, the ethyl chloride, which might be expected to be the more active, is found to be less active than methyl chloride.

By our invention we have overcome the difficulties pointed out above, and we are able to produce a mixture of methyl, ethyl, and methylethyl lead compounds economically and in commercial quantities.

As a specific example of one mode of carrying out our invention for the manufacture of a mixture of tetramethyl lead, trimethylethyl lead, dimethyldiethyl lead, methyltriethyl lead, and tetraethyl lead, where large quantities of the methyl-ethyl compounds are desired, we use, by weight, 1380 parts of the sodium-lead alloy, NaPb, 160 parts of methyl chloride, 416 parts of ethyl chloride, and a catalyst consisting of 2 parts of aluminum alloy and 4 parts of anhydrous aluminum chloride. The sodium-lead alloy is ground through a ¼-inch jaw crusher and is kept substantially free from oxidation. The methyl chloride and ethyl chloride are of a high grade of purity and are, in particular, substantially free from compounds of oxygen, nitrogen and sulfur. The aluminum alloy used contains about 7.5 per cent copper, 1.5 per cent zinc, 1.2 per cent iron and 1.5 per cent silicon, the balance being aluminum. This alloy is used in the form of chips small enough to pass through a 20-mesh screen. These materials are placed in an autoclave equipped with a stirrer and with a jacket having suitable connections for controlling the temperature with steam or with water. The contents of the autoclave are kept substantially free from greases and from air and moisture. The reaction mass is stirred and is maintained at about 100° C. for four hours when the reaction is substantially completed. The autoclave is cooled and vented, and the reaction mass is discharged into a still equipped with an agitator and steam jets, and is subjected to steam distillation, the alkyl lead compounds formed distilling over with the steam. By careful control of the operation yields of alkyl lead compounds of at least 85 per cent, based on the sodium, have been obtained and the product contains by weight, approximately 5.5 per cent tetramethyl lead, 24 per cent trimethylethyl lead, 37.5 per cent dimethyldiethyl lead, 26 per cent methyltriethyl lead and 7 per cent tetraethyl lead. This mixture of lead compounds is a good antiknock for commercial gasolines.

The mode of practicing our invention may be varied in many ways. We obtain a high yield when using the alloy corresponding to the formula NaPb (10 per cent Na) but other alloys of sodium and lead may be employed. Good yields are obtained with a sodium content varying from 7 to 18 per cent. When the alloy corresponds to the formula $Na_5Pb_2$ (21.7 per cent Na) the yield falls off substantially. If the sodium content is below 7 per cent the alloy becomes tougher and harder to handle so that we prefer not to use a sodium content below this percentage. The range of sodium content described above we term "in the neighborhood of NaPb". The sodium-lead alloy ground as specified contains about the right proportions of fine and coarse particles to maintain a suitable rate of reaction, but the particle size may be varied as desired.

In the above specific example we have used our preferred halides, methyl chloride and ethyl chloride, in the molecular proportion of 1 to 2 so as to obtain a product containing substantially equal numbers of methyl and ethyl radicals. We may vary the proportions of these two halides put in the autoclave in order to vary the percentages of the five constituents in the product manufactured. If we desire to obtain a product containing a larger proportion of the compounds higher in ethyl groups, such as dimethyldiethyl lead and methyltriethyl lead, we increase the proportion of ethyl chloride to methyl chloride in the mixture of alkyl halides used. The reaction can take place in both the liquid and the vapor, but where the reaction takes place chiefly in the liquid, as in the above specific example, the ratio of methyl to ethyl radicals in the product is governed principally by the ratio of methyl chloride to ethyl chloride in the liquid in the autoclave. Since the latter ratio is affected by the dimensions of the equipment and by the amount of the reagents employed, the exact proportions of the halides to be used in each case will be chosen according to the specific conditions of operation and the composition of the product desired.

In the above specific example we have used methyl chloride and ethyl chloride as our preferred alkyl halides. However, in place of methyl chloride we may use methyl bromide or methyl iodide, so that the process is, generally, a methyl halide-ethyl chloride process.

The reaction is exothermic, and cooling is employed when the process is under way. The presence of liquid in the autoclave facilitates the control of the temperature of the reaction mass by making it easier to stir the mass and expediting the transfer of heat to the cooling surfaces, and this may be accomplished by the use of an excess of halides. In the above specific example we use 160 per cent of the quantity of alkyl halide necessary to react with all the sodium present and this is sufficient to permit adequate control. The quantity of liquid may be varied to suit the conditions of operations. The unused alkyl halide may be recovered when the autoclave is vented. As a substitute for part or all of the excess alkyl halide we may use an inert solvent, such as hexane, benzene, decahydronaphthalene or kerosene. When evaporative cooling is used, the lower boiling solvents are preferred.

The mixture of aluminum alloy and aluminum chloride is used as the catalyst because it affords a satisfactory control of the reaction. Apparently the aluminum chloride initiates the reaction in a shorter time, or at a relatively low temperature and at a moderate rate, while the aluminum alloy causes it to proceed at a suitable rate thereafter. Either of these may be used alone as a catalyst, and they are only two individuals of a large family of "aluminum type" catalysts. For example, we may use metallic aluminum with the addition of an activator which will cause it to react under the conditions of operations in the autoclave. Such an activator may be one or more of many elements or compounds, of which we have found iodine, zinc, tin, magnesium, mercuric chloride, mercuric bromide, and rhenium chloride to give good results. Another method of activating the aluminum consists in alloying it with one or more metals. Such alloys include, beside the one named in the specific example, the following aluminum alloys, parts being given, on a weight basis, of other metals alloyed with the aluminum: 3.75 per cent magnesium; 5 per cent or 12.5 per cent silicon; 1 per cent magnesium and 1.25 per cent manganese; 1.25 per cent magnesium, 0.36 per cent chromium and 0.7 per cent silicon; 12 per cent or 8 per cent copper; 10 per cent copper, 1.2 per cent iron and 0.2 per cent magnesium; 30 per cent zinc; 10 per cent chromium; and 1.2 per cent magnesium, 4 per cent copper and 2 per cent nickel. This list comprises alloys which are available commercially, and is merely illustrative of the wide variation in aluminum alloys which may be used.

In order to determine which alloys may be used as catalysts, we may use as an index their tendency to react with an alkyl halide such as normal butyl chloride, tertiary butyl chloride, or isopropyl bromide. We prefer to use normal butyl chloride and the test is carried out at its boiling point under reflux. When reaction takes place, the alloy is dissolved with evolution of heat and formation of gas and of gummy or liquid, colored products. We find that the reactivity towards butyl chloride constitutes a rough measure of the effectiveness of an alloy as catalyst. The product of such reaction with butyl chloride or another alkyl halide may be used as a catalyst. We may use a similar product prepared by interaction of an alkyl halide with aluminum or an aluminum alloy, in the presence of a sensitizer such as iodine, ferric chloride, or stannic bromide. Some aluminum catalyst is present in the reaction mass after completion of the reaction in the autoclave and may be used as a catalyst in subsequent reactions. Dimethylaluminum chloride, methylaluminum dichloride, mixtures of these two, aluminum ethoxide, ethylaluminum diiodide, dimethylaluminum bromide and trimethylaluminum are also good catalysts. The exact nature of the aluminum compounds which enter into the reaction and which we term the "active form of the aluminum-type catalysts" is not known and by the phrase "catalysts of the aluminum type" we mean substances of the general nature above described which are put into the autoclave.

The number, amount, kind, and character of the catalysts employed may be varied between wide limits, in conjunction with the other variables, in order to secure a desired set of conditions of operations. In variations of the above specific example, both the amounts and the relative proportions of aluminum alloy and aluminum chloride may be varied in order to modify the rate at which the reaction is initiated and proceeds. In these variations, good results have been obtained with a total amount of aluminum from one-tenth per cent to one per cent of the NaPb used, and with the percentage of this aluminum present in the form of chloride varying from 3 to 30 per cent. The proportions or catalysts given herein are used to show the wide range which may be employed and not as the limits of the utility of the catalyst. When an aluminum alloy is used as catalyst, with or without aluminum chloride, low yields have been improved by the addition of iodine, in amounts of the order of one-half to two times that of the aluminum alloy. In another variation of this use of multiple catalysts, good results have been obtained by using a smaller proportion of aluminum alloy and aluminum chloride, and adding progressively a solution of methylaluminum chlorides to the reaction mass.

Catalysts other than those of the aluminum type, such for instance as boron trifluoride and dimethylberyllium, may be used in our process.

While in the above specific example all the alkyl halides and the catalyst are introduced into the autoclave before the beginning of the reaction we may, as another mode of practicing our invention, add a portion or all of the alkyl halides and catalysts either intermittently or continuously during the progress of the reaction.

The order of addition of the halides may also be varied. We may, for instance, add a substantial portion or all of one alkyl halide before adding the other, or we may vary the ratio of the two alkyl halides during the addition. The rate of addition of the halides may be sufficiently slow in comparison with the rate of reaction so that little or no halide is present in the liquid, and the reaction takes place chiefly in the vapor.

The progressive addition of the catalyst may be effected by different methods such as, for example, the introduction of a solution, in alkyl halide or neutral solvent, of a soluble form of catalyst. For example, we may vary the above specific example by employing instead of the aluminum catalyst there named a methyl chloride solution of four parts of aluminum in the form of methylaluminum chlorides. After the reaction mass is heated to about 100° C. this solution is introduced into the autoclave continuously or intermittently during the course of about two hours, the rate of addition being adjusted to give a desired rate of reaction. By this procedure a satisfactory control of the temperature and rate of reaction is readily obtained. In another variation of this type of control, the catalyst may be introduced at the beginning of the reaction in such form that it enters into the reaction gradually. For example, an aluminum alloy catalyst is introduced in the form of particles of different sizes which are in part materially larger than those used in our above specific example.

In the specific example given, the temperature of 100° C. is about the optimum, although good yields have been obtained, particularly with an aluminum alloy catalyst, at temperatures below 80° C. and as high as 135° C.

It is evident from the above disclosures that, by suitable adjustment and correlation of the different variables, the process can be carried out under a wide variety of conditions. The optimum operating conditions will, of course, be determined by the particular requirements of each case, such as, for example: the composition desired for the product, an economic balance between yield and rate of production, or the ease of control of operations.

Any individual compound or any mixture which may be desired can be obtained by appropriate fractionation of the reaction product. For example, the dimethyldiethyl lead may be separated, and this constitutes a good antiknock.

Different desirable antiknock mixtures composed of trimethylethyl lead, dimethyldiethyl lead, methyltriethyl lead and tetraethyl lead, and no tetramethyl lead, may be prepared. In order to obtain a given mixture of these compounds by the above described process, we adjust the proportions of methyl and ethyl radicals in the product in such a way that the four desired compounds are present in the product in approximately the desired proportions. The unwanted portion of the product, including the tetramethyl lead, is removed by fractional distillation, leaving the desired mixture. Repetition of this will result in an accumulation of the undesired part. This accumulation can be avoided by combining with the above described manufacturing process, the redistribution process described and claimed in our co-pending application Ser. No. 190,876, filed February 16, 1938.

In this redistribution process one or more tetraalkyl lead compounds containing at least two kinds of alkyl radicals are employed and the alkyl radicals are redistributed, in the presence of a catalyst, between the lead atoms present, to produce a group of alkyl lead compounds containing some or all of the possible combinations of the alkyl radicals used. Referring to the methyl and ethyl radicals, as an example, we can take one or more lead compounds containing both of these radicals and produce a reaction in which the alkyl radicals are redistributed to form the five possible compounds: tetramethyl lead, trimethylethyl lead, dimethyldiethyl lead, methyltriethyl lead and tetraethyl lead. The starting material for this reaction may be a mixture of the two tetraalkyl compounds or any one of the three methylethyl compounds (trimethylethyl lead, dimethyldiethyl lead, and methyltriethyl lead) or any mixture of such compounds. By varying the relative amounts of methyl and ethyl radicals introduced into the reaction, the relative amounts of the five products formed can be changed.

In combining this redistribution process with our above-described manufacturing process in order to avoid the accumulation of the undesired part of the product, the amount of such product separated from the product of each batch is added to the reaction mass of the next batch, and the proportion of methyl and ethyl halides used is adjusted accordingly. When this is done the amount of the undesired part of the product present in the final product is the same in all the batches, so that it does not accumulate. Since, in this combined process, the redistribution reaction proceeds readily under the conditions for the manufacturing reaction and merely in the presence of a catalyst suitable for this manufacturing reaction, it appears that the "active forms" of the above-named catalysts for the manufacturing process constitute satisfactory catalysts for this redistribution reaction when the two reactions are carried out simultaneously. In order to obtain good yields and to avoid an excessive decomposition of the alkyl lead compounds, it is advantageous to add these compounds after the manufacturing reaction is at least partly completed.

We have found that the reactions involved in the above described manufacturing process include the reactions of the redistribution process.

We claim:

1. The process of making a mixture of methyl and ethyl lead tetraalkyl compounds including the methyl-ethyl lead compounds which comprises reacting ethyl chloride and a methyl halide with a sodium lead alloy, having a sodium content between 7 and 18 percent by weight, in the presence of a catalyst.

2. The process of making a mixture of methyl and ethyl lead tetraalkyl compounds including the methyl-ethyl lead compounds which comprises reacting ethyl chloride and a methyl halide with a sodium lead alloy, having a sodium content between 7 and 18 percent by weight, and placing in the reaction mass a catalyst of the aluminum type.

3. The process of making a mixture of methyl and ethyl lead tetraalkyl compounds including the methyl-ethyl lead compounds which comprises reacting ethyl chloride and a methyl halide with a sodium lead alloy, having a sodium content between 7 and 18 percent by weight, and placing in the reaction mass two catalysts, one of which acts more rapidly than the other in initiating the reaction.

4. The process of making a mixture of methyl and ethyl lead tetraalkyl compounds including the methyl-ethyl lead compounds which comprises reacting ethyl chloride and a methyl halide with a sodium lead alloy, having a sodium content between 7 and 18 percent by weight, in the presence of a catalyst, and maintaining the temperature during the greater part of the reaction in the neighborhood of 100° C.

5. The process of making a mixture of methyl and ethyl lead tetraalkyl compounds including the methyl-ethyl lead compounds which comprises reacting ethyl chloride and methyl chloride with a sodium lead alloy, having a sodium content between 7 and 18 percent by weight, in the presence of a catalyst.

6. The process of making a mixture of methyl and ethyl lead tetraalkyl compounds including the methyl-ethyl lead compounds which comprises reacting ethyl chloride and methyl chloride with a sodium-lead alloy, having a sodium content between 7 and 18 percent by weight, and placing in the reaction mass a catalyst of the aluminum type.

7. The process of making a mixture of methyl and ethyl lead tetraalkyl compounds including the methyl-ethyl lead compounds which comprises reacting ethyl chloride and methyl chloride with a sodium lead alloy, having a sodium content between 7 and 18 percent by weight, in the presence of a catalyst, and maintaining the temperature during the greater part of the reaction between 80° C. and 135° C.

8. The process of making a mixture of methyl and ethyl lead tetraalkyl compounds including the methyl-ethyl lead compounds which comprises reacting ethyl chloride and methyl chloride with NaPb and placing in the reaction mass an aluminum alloy catalyst.

9. The process of making a mixture of methyl and ethyl lead tetraalkyl compounds including the methyl-ethyl lead compounds which comprises reacting ethyl chloride and methyl chloride with NaPb and placing in the reaction mass aluminum chloride and an aluminum alloy catalyst.

10. The process of making a mixture of methyl and ethyl lead tetraalkyl compounds including the methyl-ethyl lead compounds, the mixture containing a desired ratio of methyl radicals to ethyl radicals which comprises reacting ethyl chloride and a methyl halide, in relative quantities to have present a higher ratio of ethyl radicals to methyl radicals than in the mixture produced, with a sodium-lead alloy, having a sodium content between 7 and 18 percent by weight, in the presence of a catalyst.

11. The process of making a mixture of methyl and ethyl lead tetraalkyl compounds including the methyl-ethyl lead compounds, the mixture containing a desired ratio of methyl radicals to ethyl radicals which comprises reacting ethyl chloride and methyl chloride, in relative quantities to have present a higher ratio of ethyl radicals to methyl radicals than in the mixture produced, with a sodium-lead alloy, having a sodium content between 7 and 18 percent by weight, in the presence of a catalyst.

12. The process of making a mixture of methyl and ethyl lead tetraalkyl compounds including the methyl-ethyl lead compounds, the mixture containing a desired ratio of methyl radicals to ethyl radicals which comprises reacting ethyl chloride and methyl chloride, in relative quantities to have present a higher ratio of ethyl radicals to methyl radicals than in the mixture produced, with NaPb, and a catalyst of the aluminum type, and maintaining the temperature during the greater part of the reaction in the neighborhood of 100° C.

13. The process of making a mixture of methyl and ethyl lead tetraalkyl compounds including the methyl-ethyl lead compounds which comprises reacting ethyl chloride and a methyl halide with a sodium-lead alloy, having a sodium content between 7 and 18 percent by weight, in the presence of a catalyst of which a part is added while the reaction is in progress.

14. The process of making a mixture of methyl and ethyl lead tetraalkyl compounds including the methyl-ethyl lead compounds which comprises reacting ethyl chloride and a methyl halide with a sodium-lead alloy, having a sodium content between 7 and 18 percent by weight, in the presence of a catalyst of which a part is added in liquid form while the reaction is in progress.

15. The process of manufacturing a mixture of tetramethyl lead, trimethylethyl lead, dimethyldiethyl lead, methyltriethyl lead and tetraethyl lead, which comprises reacting ethyl chloride and methyl chloride with a lead sodium (NaPb) in the presence of an aluminum alloy serving as catalyzer, and maintaining the reaction mass at about 100° C. until the reaction is substantially completed.

16. The process according to claim 15 in which the aluminum alloy contains copper, zinc, iron and silicon.

17. The process of making a mixture of methyl and ethyl lead tetraalkyl compounds including the methyl-ethyl lead compounds which comprises reacting a mixture of approximately the following parts by weight h. 1,380 parts NaPb, 160 parts methyl chloride, and 416 parts ethyl chloride, in the presence of a catalyst of the aluminum type.

18. The process of making a desired part of a mixture of methyl and ethyl lead tetraalkyl compounds including the methyl-ethyl lead compounds which comprises making a mixture according to claim 1, separating out the undesired part of the mixture, and reacting in a vessel ethyl chloride, methyl halide and a sodium-lead alloy, having a composition in the neighborhood of NaPb in the presence of a catalyst, with the undesired part of the product of the first reaction present in the vessel.

19. The process of making a desired part of a mixture of methyl and ethyl lead compounds including the methyl-ethyl lead compounds which comprises making a mixture in accordance with claim 10, separating the undesired part of the mixture, and repeating the process in accordance with claim 10 with the undesired part of the mixture from the previous reaction present, the proportion of ethyl to methyl radicals being the same as in the first reaction.

GEORGE CALINGAERT.
HAROLD A. BEATTY.